United States Patent [19]

Atkin

[11] Patent Number: 4,726,329

[45] Date of Patent: Feb. 23, 1988

[54] INLET MANIFOLD FOR V-CONFIGURATION INTERNAL COMBUSTION ENGINES

[75] Inventor: Graham E. Atkin, Norwich, United Kingdom

[73] Assignee: Austin Rover Group Limited, Coventry, United Kingdom

[21] Appl. No.: 854,761

[22] Filed: Apr. 22, 1986

[30] Foreign Application Priority Data

May 4, 1985 [GB] United Kingdom ............... 8511450

[51] Int. Cl.⁴ .............................................. F01B 75/18
[52] U.S. Cl. ........................ 123/52 MB; 123/52 MV
[58] Field of Search ......... 123/52 M, 52 MB, 52 MC, 123/52 MV

[56] References Cited

U.S. PATENT DOCUMENTS

| | | | |
|---|---|---|---|
| 3,370,575 | 2/1968 | Soubis | 123/52 M |
| 3,814,069 | 6/1974 | Croft et al. | 123/52 M |
| 4,440,120 | 4/1984 | Butler | 123/52 MC |
| 4,446,823 | 5/1984 | Bessho | 123/52 MB |
| 4,455,975 | 6/1984 | Kume | 123/52 MV |
| 4,538,556 | 9/1985 | Takeda | 123/52 MB |

FOREIGN PATENT DOCUMENTS

| | | |
|---|---|---|
| 0177794 | 4/1986 | European Pat. Off. . |
| 2551801 | 3/1985 | France . |
| 2121473A | 12/1982 | United Kingdom . |
| 2160264 | 12/1985 | United Kingdom ............ 123/52 M |

Primary Examiner—Craig R. Feinberg
Assistant Examiner—David A. Okonsky
Attorney, Agent, or Firm—Thomas J. Greer, Jr.

[57] ABSTRACT

An inlet manifold 7 for both banks of cylinders of a V-configuration internal combustion engine has two different lengths of tuned inlet passage between a plenum 14 and an inlet valve 3. A first length extends from an opening 13a in one face (in this case the upper) of the plenum 14. A second length extends the first length when valve 13 closes the opening 13a, passes along passage 16 around the side of the plenum remote from the cylinder 2, and communicates with the other face (in this case the lower) via an opening 18. It is possible to construct such a manifold in three parts: a plastics moulding 10 defining the plenum 14; two metal pressings 8, 9 which engage each other; and a third metal pressing 11. Such a construction can be cheaper and lighter than hitherto.

13 Claims, 5 Drawing Figures

INLET MANIFOLD FOR V-CONFIGURATION INTERNAL COMBUSTION ENGINES

This invention relates to inlet manifolds for V-configuration i.c. engines and in particular to those having two different tuned lengths of inlet passage for each cylinder.

Tuning of inlet manifolds means selecting a particular diameter and, more important, length of inlet passage so that resonance effects assist the entry of the column of air contained in the inlet passage into the respective cylinder. However the optimum length for such a passage varies with the speed of the engine, the appropriate length for a slow engine speed being greater than that for a high engine speed. Whereas there is inevitably a compromise for engines with a single tuned length (the inlet passages usually being tuned for high speeds at which volumetric efficiency falls off), it has been proposed to have two possible tuned lengths of inlet passage: the first length opens into the upper face of a plenum when a poppet valve is opened; the second length if a continuation of the first length and opens into the side of the plenum.

The invention provides an inlet manifold for a V-configuration internal combustion engine, comprising: a plenum extending approximately parallel to the axis of the crankshaft; a first length of inlet passage for each cylinder extending from the face of the plenum that is nearer to, or further from, the crankshaft axis; a valve for each first length of inlet passage which can be opened so that each first length of inlet passage communicates with the plenum; a second length of inlet passage for each cylinder which is continuous with the first length, which extends around the side of the plenum remote from the respective cylinder and which communicates with the face of the plenum that is further from, or nearer to, respectively the crankshaft axis.

Such a design of manifold facilitates its construction.

Advantageously, the manifold includes a number of parts that extend the length of the engine and are joined together at the regions at which the first lengths communicate with the plenum and at the regions at which the second lengths communicate with the plenum. This sandwich type arrangement facilitates the construction compared to the previous design referred to which necessitates the use of castings. Preferably, the part which is joined at the regions at which the second lengths communicate with the plenum and which includes the end portions of the second lengths is defined by two shaped members that engage each other. The shaped members may be metal pressings or plastics mouldings, and they may also define the adjacent face of the plenum.

Advantageously, the part which is joined at the regions at which the second lengths communicate with the plenum and which defines the plenum comprises a member in which are integrally formed the parts of the second lengths that extend around the side of the plenum, and preferably also the parts of the first lengths of the inlet passages which connect to the cylinder heads are also integrally formed in the member defining the plenum. The member defining the plenum is preferably a plastics moulding.

Advantageously, the part which is joined at the regions at which the first lengths communicate with the plenum and which includes the first lengths is defined by a third shaped member, for example, a pressing or moulding.

The valves which can be opened so that the first lengths of inlet passage communicate with the plenum may be poppet valves but are preferably flap valves.

An inlet manifold for an internal combustion engine constructed in accordance with the invention will now be described by way of example with reference to the accompanying drawings, in which FIG. 1 is an axial cross-section through the manifold;

Figure 1:
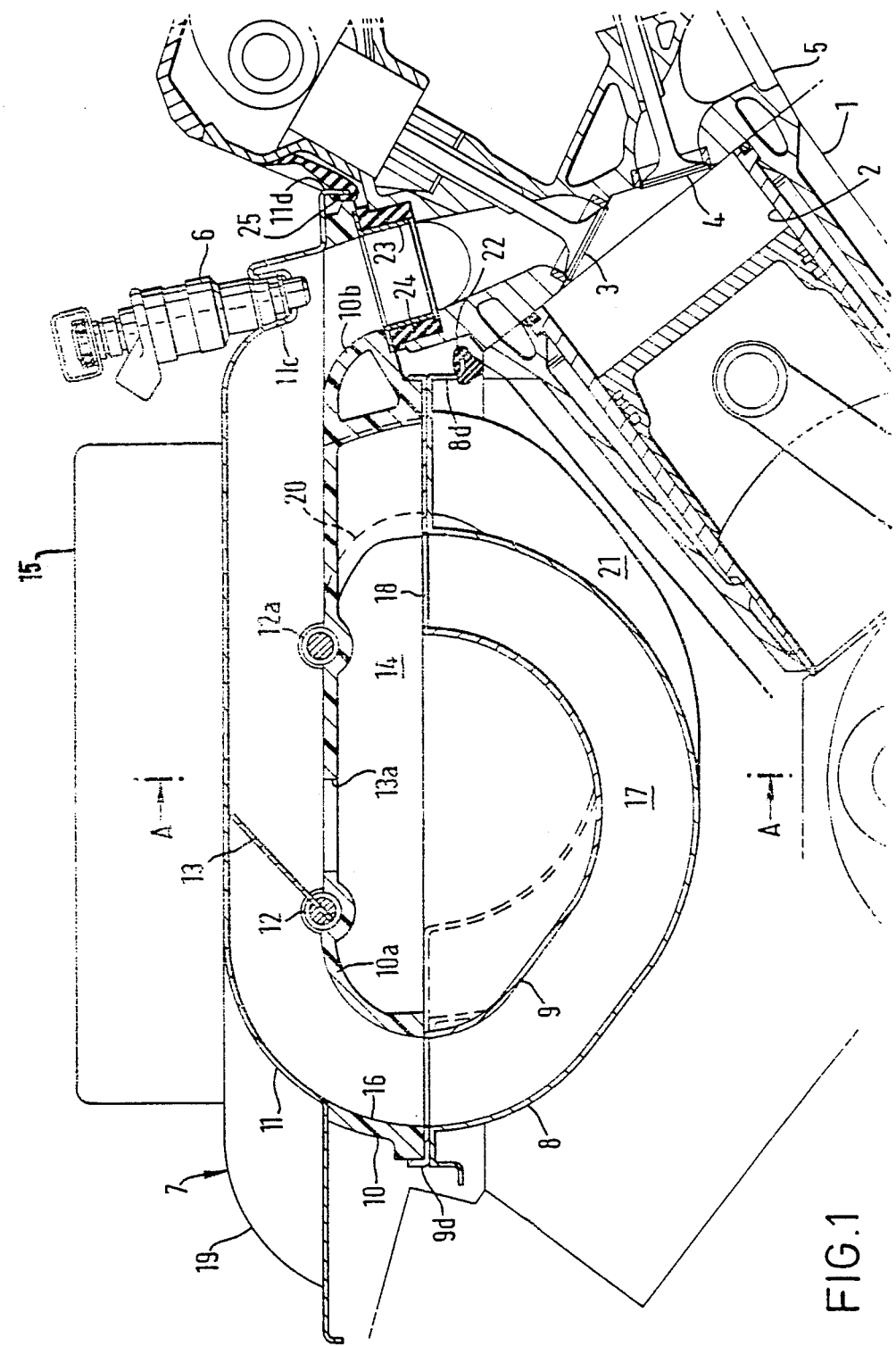

The manifold supplies both banks of cylinders of a V-6 spark ignition fuel injected engine.

Part only of the cylinder block 1 is shown, and only the right hand (as seen in the drawing) bank of cylinders is shown sectioned. The sectioned cylinder 2 has an inlet valve 3 and an outlet valve 4 located in a cylinder head 5 for the right hand bank of cylinders, and a fuel injector 6. The other cylinders of the right hand back have similar valves and injectors, as do the three cylinders of the left hand bank. However, the latter are offset in a direction parallel to the crankshaft axis with respect to their counterparts of the right hand bank.

The manifold indicated generally by the reference numeral 7 is made up of a three part sandwich of parts, namely, two shaped metal pressings 8, 9 which engage each other, a plastics moulding 10, and a third metal pressing 11, joined at the regions at which first lengths and second lengths of inlet passage communicate with a plenum (to be described in more detail hereinafter). A shaft 12 of a flap valve 13 is held between integral depressions in the metal pressing 11 and in the moulding 10, which depressions serve as bearings for the shaft. The valve 13 is provided for the inlet passage for the cylinder 2: similar valves are provided for each of the other inlet passages.

The moulding 10 defines a plenum or air chamber 14 which extends parallel to the axis of the crankshaft (at right angles to the place of the paper) and communicates at one end of the block with an air flow meter (not shown) and in turn with air cleaner 15.

The manifold provides two alternative lengths of tuned inlet passage which are appropriate to different engine speeds.

With the valve 13 covering opening 13a in the moulding 10, the inlet passage extends from the inlet valve 3 across the width of the plenum 14, around the left-hand side (as seen in the drawing) of the plenum through integrally formed aperture 16 in the moulding 10, and back across the underside of the plenum through curved section 17, opening into the lower face of the plenum at opening 18. This length of inlet passage is appropriate to slower engine speeds.

At higher engine speeds, the valve 13 is opened, thereby uncovering opening 13a and blocking the inlet passage. The passage from the inlet valve 3 now has a shorter length before it opens into the plenum at opening 13a.

Thus, when the valve 13 uncovers the opening 13a, only a shorter first length of inlet passage is in operation. When the valve 13 closes the opening 13a, a second length of inlet passage continuous with the first, and opening into the opposite face of the plenum to the first, is also brought into operation. It is seen that the first and second lengths of inlet passages are partially coextensive. It is further seen that opening 13a may be considered one face of the plenum while opening 18 may be considered a second face of the plenum.

The valve 13 is opened and closed in dependence upon the vehicle load and speed. The motive power may be provided by solenoids or by manifold depression.

The other right hand cylinders have identical dual length inlet passages. The cylinders of the left-hand bank are offset in a direction parallel to the crankshaft axis with respect to their right-hand counterparts. However, the following parts can be seen in the drawing of an inlet passage for a cylinder of the left-hand bank: a part 19 of the first length defined by the third shaped pressing; the part 20 of the second length which extends around the side of the plenum and is integrally formed in the moulding (seen in dotted outline); and the part 21 of the second length that extends back across the width of the plenum and opens into its lower face (seen in front view and in dotted outline). The inlet passages for the left-hand bank are mirror images to those of the right hand bank.

The construction of the manifold will now be explained. The four parts 8–11 together define both inlet lengths for all the cylinders.

Figure 2:
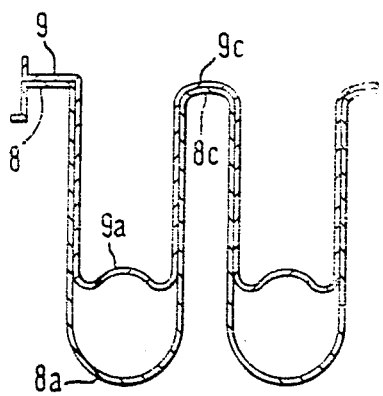
FIG. 2 is a fragmentary section taken on the lines A—A of FIG. 1 of the first two shaped members only.

The parts of the second lengths of inlet passage that lie below the regions 18 at which the second lengths open into the plenum, that is, below the lower face of the plenum, are made up of the two metal pressings 8, 9. The pressing 9 nests in the pressing 8 (FIG. 2). The pressing 8 defines the lower part of the circumference of the inlet passages, the pressing 9 the upper parts. The corrugations 8a, 9a in the pressings 8, 9 alternate in the direction of the crankshaft axis between those for inlet passages for one bank of cylinders and those for the other bank. In between the corrugations the pressings have flat portions 8c, 9c which lie flat against the lower surface of the moulding 10. After a blank has been pressed into the shape 9, it is necessary to punch openings in it to provide the openings 18 and openings registering with the openings 17. Alternatively, this can be done during the pressing operation.

The pressing 8 has a lip 8d for supporting the manifold on the block via resilient strip 22, and the pressing 9 has a lip 9d for locating the moulding 10. The resilient strip 22 seals the space above the crankcase, which space may be connected to the plenum 14 to provide for crankcase ventilation; the connection may be via the air cleaner 15 to reduce emissions.

The moulding 10 has in its lower face a recess 10a which is of inverted U-shape, which is open-ended, and which extends the length of the manifold to define the plenum 14. The moulding also has individual openings 13a, curved passages 16, one for each inlet passage, and apertures 10b which register with the parts of the inlet passage in the heads. Metal ferrules secured to the moulding, and resilient sleeves 24 are interposed between the ferrules and the adjacent sections of the head in order to mechanically isolate the manifold from the heads.

Figure 3:
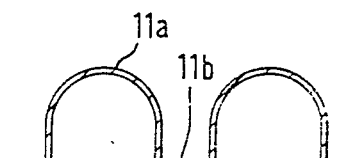
FIG. 3 is a fragmentary section taken on the lines A—A of FIG. 1 of the third shaped member only.

The third metal pressing 11 is also corrugated in a direction parallel to the crankshaft axis (FIG. 3). Again, alternate corrugations 11a define inlet passages for cylinders of alternate banks. Between corrugations 11a lie flat portions 11b which lie flat against the upper face of the moulding. The pressing also has depressions 11c for supporting fuel injectors 6. The pressing 11 also has a lip 11d which seats in an axially-extending groove in the head via a resilient strip 25.

The four parts of the manifold are secured together, around the flap valves 13 on their shafts 12, by adhesive. The moulding has projections (not shown) to locate with the pressing 11.

As compared with known manifolds offering dual tuned lengths of inlet passage which require heavy and expensive castings, the manifold of the invention can be made cheaply and light.

Of course, various alternatives are possible in the design and construction of the manifold without departing from the scope of the invention. Thus, if desired, the manifold could be inverted so that the inlet passage curved in an upward loop (as seen in the drawing) before opening into the plenum rather than in a downward loop as illustrated. Although the flap valve 13 blocks the inlet passage when it uncovers opening 13a, it is not necessary for this to happen. Even if the inlet passage was not blocked and both openings 13a, 18 to the manifold were open, the air would still be drawn via the shorter path from opening 13a. The flap valves 13 could be replaced by poppet valves or other types of valves. Instead of fuel injection, the arrangement could be used with a carburetor.

Instead of aperture 13a being in the left-hand half of the manifold as seen in the drawing, it could be moved to the right: the aperture 13a could be moved to the right hand side of the right hand pivot axis 12a, and the flap valve 13 could then be mounted on the right hand pivot axis, travelling over the same angular path as before. This would provide a shorter first length of inlet passage.

Figure 4:
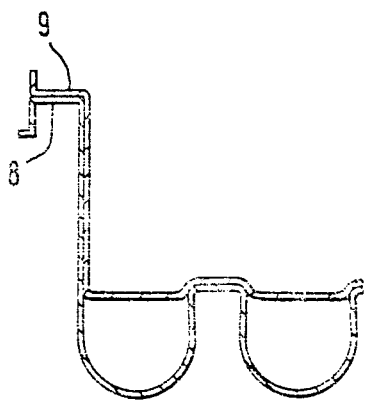
FIG. 4 is an alternative form of the parts shown in FIG. 2.

The plenum could extend below the lower face of the moulding 10. Thus, pressings 8, 9 do not have to extend up to the moulding 10 over portions 8c, 9c: these portions could be approximately level with the portion of 9 in the drawing which defines the upper circumference of the tubes, as shown in FIG. 4. In fact portion 9 could be almost flat in the crankshaft axis direction. The plenum would then extend into the space above the pressing 9 and be of larger volume.

Figure 5:
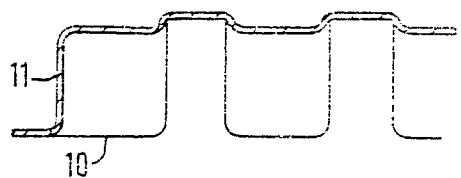
FIG. 5 is an alternative form of the parts shown in FIG. 3.

Equally, instead of the pressing 11 being deeply corrugated which might make its manufacture difficult, the divisions between adjacent first lengths of inlet passages (which will be for alternate cylinders) may be formed integrally with the plenum, as shown in FIG. 5.

The moulding may be of phenolic or re-inforced polyester or other material, and could be compression moulded or injection moulded. If desired, the component could be cast from metal or other material.

The pressings 8, 9, 11 could be of aluminium or steel or other metals; or could be moulded from plastics or other materials such as dough moulding composition.

The arrangement can be used with different numbers of cylinders.

What is claimed is:

1. An inlet manifold for a V-configuration internal combustion engine, comprising: a plenum extending approximately parallel to the axis of the crankshaft; a first length of inlet passage from the plenum to the intake of each cylinder, said first length extending from a first face of the plenum to the intake of each cylinder to provide a first tuned length of inlet passage; a valve for each first length of each inlet passage, which valve can be opened so that each first length of each inlet passage communicates with the plenum; a second length of inlet passage from the plenum to each cylinder, which second length is partially coextensive with the first length in communication therewith upstream of said valve, the second length extending around a side of the plenum remote from the respective cylinder and which communicates with a second face of the plenum to provide a second tuned length of each inlet passage which is also greater in length than said first passage, said second plenum face being opposed of said first plenum face and spaced therefrom in a direction extending radially from said crankshaft axis so as to be closer to said axis than said first plenum face.

2. An inlet manifold as claimed in claim 1, wherein resilient bushes are interposed between the manifold and cylinder heads of said V-configuration engine.

3. An inlet manifold as claimed in claim 1, wherein the manifold includes a plurality of parts that extend over the length of the engine and are joined together at said first and second plenum faces.

4. An inlet manifold as claimed in claim 3, wherein two shaped members that engage each other abut said second plenum face and define end portions of said second lengths of said inlet passages.

5. An inlet manifold as claimed in claim 4, wherein the shaped members are pressings.

6. An inlet manifold as defined in claim 4, wherein the shaped members are moldings.

7. An inlet manifold as claimed in claim 3, wherein an integrally formed member defining said plenum abuts said first and second faces and has passageways therein defining parts of said second lengths that extend around the side of the plenum.

8. An inlet manifold as claimed in claim 7, wherein said integrally formed member also has passageways defining parts of the first lengths of inlet passage which connect to the cylinder heads of the internal combustion cylinder.

9. An inlet manifold as claimed in claim 8, wherein the member defining the plenum is a molding.

10. An inlet manifold as claimed in claim 3, wherein a third shaped member abutting said first face defines parts of said first lengths of said inlet passages.

11. An inlet manifold as claimed in claim 10, wherein the third shaped member is a pressing.

12. An inlet manifold as claimed in claim 11, wherein the valves are flaps which pivot about bearings defined by the third shaped member and said integrally formed member.

13. An inlet manifold as claimed in claim 11, wherein the third shaped member is a molding.

* * * * *